(12) United States Patent
Becker et al.

(10) Patent No.: US 11,626,634 B2
(45) Date of Patent: Apr. 11, 2023

(54) BATTERY UNIT INCORPORATING HEAT EXCHANGE AREAS

(71) Applicant: SOGEFI AIR & COOLING, Guyancourt (FR)

(72) Inventors: Nicolas Becker, Porte du Ried (FR); Alexandre Floranc, Logelsheim (FR)

(73) Assignee: SOGEFI AIR & COOLING, Guyancourt (FR)

( * ) Notice: Subject to any disclaimer, the term of this patent is extended or adjusted under 35 U.S.C. 154(b) by 99 days.

(21) Appl. No.: 17/044,995

(22) PCT Filed: Apr. 8, 2019

(86) PCT No.: PCT/EP2019/058808
§ 371 (c)(1),
(2) Date: Oct. 2, 2020

(87) PCT Pub. No.: WO2019/197338
PCT Pub. Date: Oct. 17, 2019

(65) Prior Publication Data
US 2021/0151818 A1    May 20, 2021

(30) Foreign Application Priority Data

Apr. 10, 2018 (FR) ...................... 18 53131

(51) Int. Cl.
*H01M 4/02* (2006.01)
*H01M 10/6556* (2014.01)
(Continued)

(52) U.S. Cl.
CPC .......... *H01M 10/6556* (2015.04); *B60K 6/28* (2013.01); *B60L 50/64* (2019.02); *B60L 58/24* (2019.02); *F28F 3/12* (2013.01); *F28F 9/0246* (2013.01); *H01M 10/613* (2015.04); *H01M 10/625* (2015.04); *H01M 10/647* (2015.04); *H01M 10/653* (2015.04); *H01M 10/6567* (2015.04);
(Continued)

(58) Field of Classification Search
CPC ....................................................... H01M 4/02
See application file for complete search history.

(56) References Cited

U.S. PATENT DOCUMENTS

| 10,367,241 B2 | 7/2019 | Enning et al. |
| 2015/0236314 A1 | 8/2015 | Lee et al. |

(Continued)

FOREIGN PATENT DOCUMENTS

DE    102012012663    12/2013

OTHER PUBLICATIONS

International Search Report dated May 9, 2019.
(Continued)

*Primary Examiner* — Jacob B Marks
(74) *Attorney, Agent, or Firm* — IPSILON USA, LLP

(57) ABSTRACT

The present invention relates to a battery unit (1) essentially comprising a plurality of cells, a housing (3) which accommodates and surrounds the cells, and means (5) for adjusting the temperature of the cells by means of the circulation of heat transfer fluid. The battery unit (1) is characterised in that the housing (3) comprises at least one, preferably multiple, area(s) of heat exchange between the cells and the heat transfer fluid, located at least in a bottom region on which the cells rest, said area(s) being incorporated into the structure of the housing (3), preferably in the wall of the latter.

22 Claims, 19 Drawing Sheets

(51) Int. Cl.
  *H01M 10/613*    (2014.01)
  *H01M 10/625*    (2014.01)
  *H01M 10/647*    (2014.01)
  *H01M 10/6567*    (2014.01)
  *B60L 50/64*    (2019.01)
  *B60L 58/24*    (2019.01)
  *B60K 6/28*    (2007.10)
  *F28F 3/12*    (2006.01)
  *F28F 9/02*    (2006.01)
  *H01M 10/653*    (2014.01)
  *H01M 50/262*    (2021.01)
  *H01M 50/278*    (2021.01)
  *H01M 50/227*    (2021.01)
  *H01M 50/204*    (2021.01)

(52) U.S. Cl.
  CPC ....... *H01M 50/204* (2021.01); *H01M 50/227* (2021.01); *H01M 50/262* (2021.01); *H01M 50/278* (2021.01); *B60Y 2200/91* (2013.01); *B60Y 2200/92* (2013.01); *B60Y 2400/112* (2013.01); *H01M 2220/20* (2013.01)

(56) References Cited

U.S. PATENT DOCUMENTS

2016/0172726 A1   6/2016   Enning et al.
2016/0222631 A1   8/2016   Kohno et al.

OTHER PUBLICATIONS

Search Report dated Feb. 7, 2020.
Chinese Notification of the First Office Action dated Jun. 30, 2022.

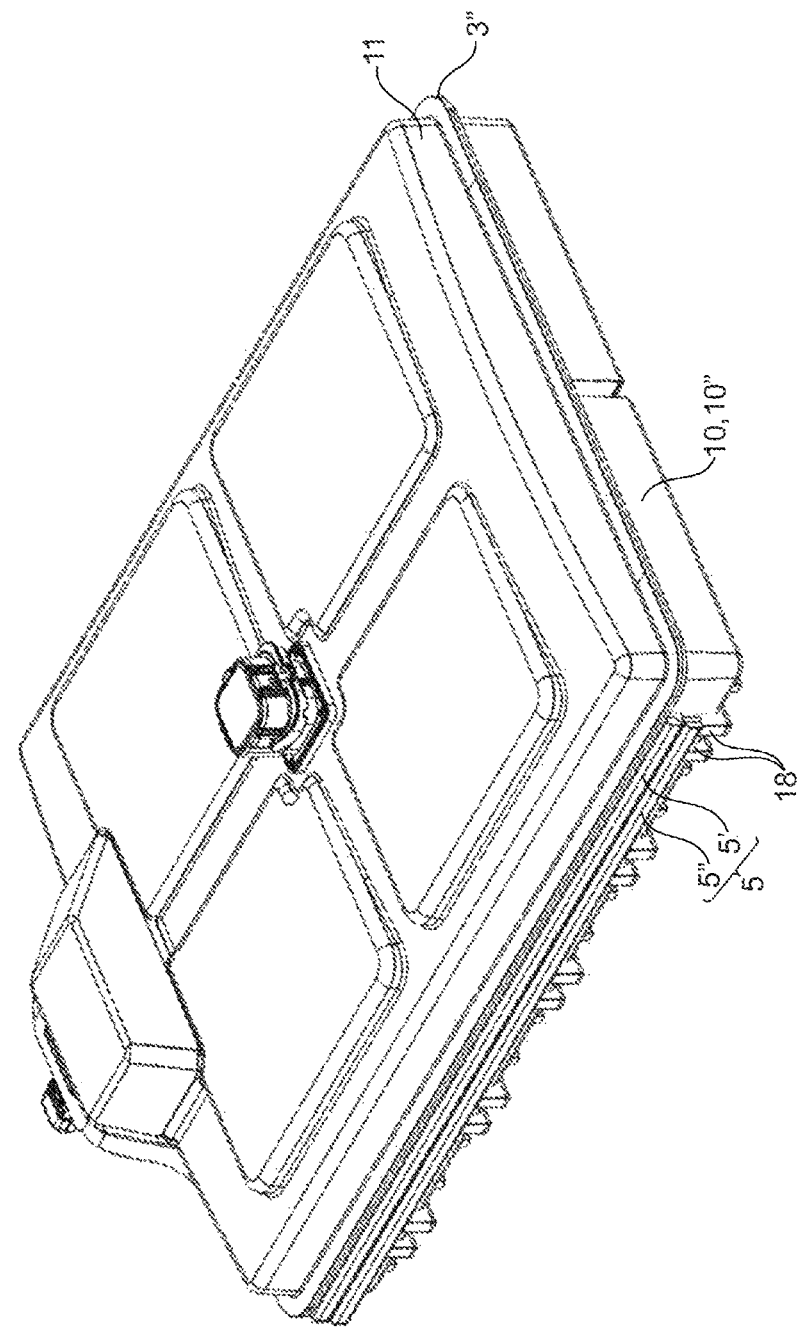

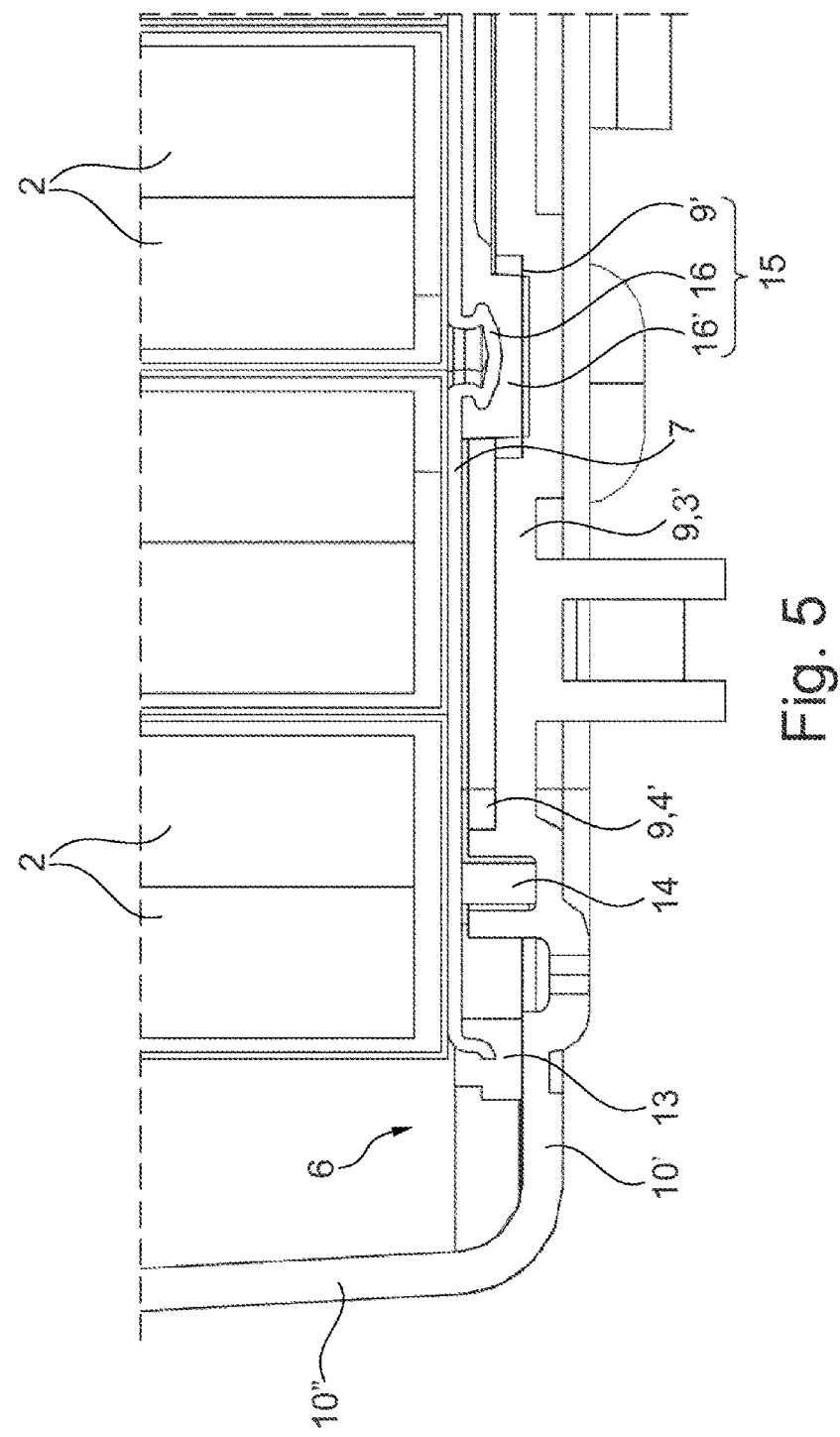

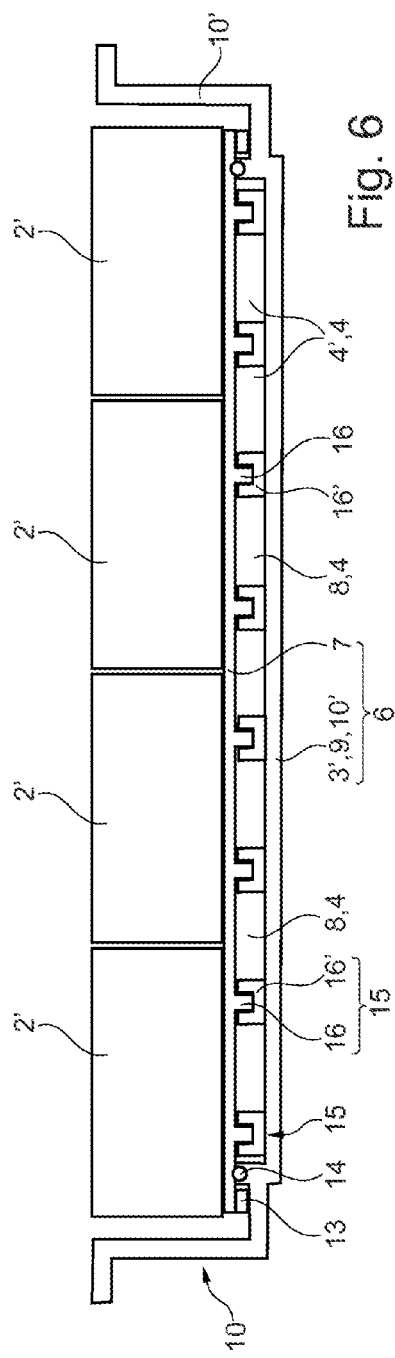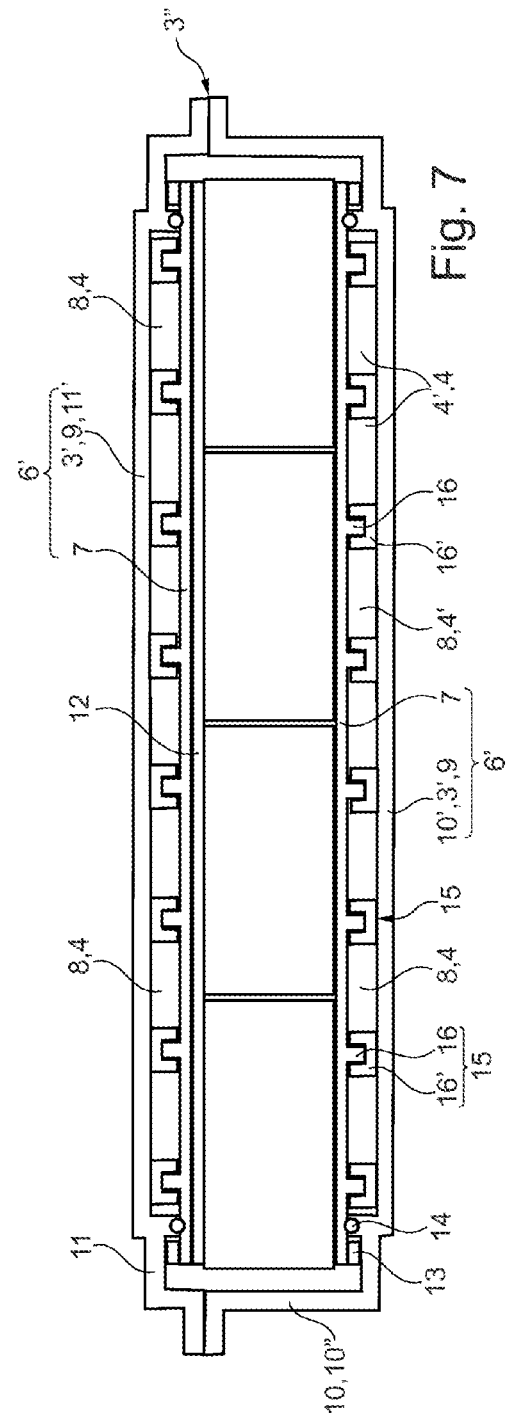

BATTERY UNIT INCORPORATING HEAT EXCHANGE AREAS

RELATED APPLICATION

This application is a National Phase of PCT/EP2019/058808 filed on Apr. 8, 2019 which claims the benefit of priority from French Patent Application No. 18 53131, filed on Apr. 10, 2018, the entirety of which are incorporated by reference.

FIELD OF THE INVENTION

The present invention relates to the field of autonomous electrical energy sources, in particular those embedded in motor vehicles, and its subject is a battery unit and a hybrid or electric motor vehicle comprising at least one such unit.

DESCRIPTION OF RELATED ART

Hybrid/electric vehicles are equipped with a battery that makes it possible to store the electrical energy necessary for their operation. The current issues require the design of the battery units, also called "battery packs" to be optimized in order to obtain the best performance levels in terms of lifespan (charge/discharge) and operating range. The charging time is also an important factor in the daily use of these battery packs.

The batteries implemented ideally need to operate at temperatures between 10° C. and 30° C., in particular the high storage density batteries, of the Li-ion or Li-polymer type for example. An excessively low temperature impacts the range and an excessively high temperature impacts the lifespan of the batteries. It is therefore necessary to regulate the temperature of the batteries to the best possible extent.

In the context of the applications embedded on vehicles, there are air-cooled battery solutions but the heat exchange remains fairly limited. The current trend is to use a heat-transfer fluid in order to improve the heat exchanges and increase the efficiency of the regulation.

Furthermore, the housings for receiving these batteries can be produced directly by a part of the vehicle or consist of cavities formed in a structural part of this vehicle. However, these solutions are not very flexible in terms of location and make maintenance difficult. The solutions involving autonomous battery packs not incorporated in the structure of the vehicle are thus to be preferred.

There are many designs in the state of the art: they use metallic solutions (steel, aluminum, etc.) with a distribution of heat-transfer fluid by hoses to cooling plates assembled and disposed inside the battery pack, on which the modules combining the cells or elements of the battery are arranged.

The result thereof is a complex construction, formed by the assembly of a large number of parts, requiring the production of numerous tight connections during manufacture (the aging resistance of which can be problematic) and forming a bulky structure with many components.

Furthermore, since the housing of the battery unit is made of metal (preferentially of aluminum), it cannot thermally and electrically insulate the battery pack to the outside, has, furthermore, a high cost price and is also subject to corrosion.

Objects and Summary:

The aim of the present invention is to overcome at least the abovementioned main limitations.

To this end, the subject of the invention is a battery unit, notably for a hybrid and/or electric motor vehicle, essentially comprising, on the one hand, a plurality of battery cells or elements, if necessary grouped together physically and/or electrically in several blocks or modules, on the other hand, a housing accommodating and surrounding said cells or elements and, finally, means for regulating the temperature of said cells or elements by circulation of heat-transfer fluid FC, said battery unit being characterized in that the housing comprises, at least in a bottom region on which the cells are arranged, at least one, preferentially several, heat exchange zone(s) between said cells and the heat-transfer fluid, said zone or zones being incorporated in the structure of said housing, preferentially in the wall thereof.

BRIEF DESCRIPTION OF THE DRAWINGS

The invention will be better understood from the following description, which relates to preferred embodiments, given as nonlimiting examples, and explained with reference to the attached schematic drawings, in which:

FIGS. 1A and 1B are perspective views from two different angles of a battery unit according to the invention, with a rectangular parallelepipedal housing formed by the assembly of a bottom tray and of a cover;

FIG. 5 is a representation of a part of the representation of FIG. 4 to a different scale;

FIG. 6 is a schematic cross-sectional view of a bottom tray equipped with batteries according to another embodiment of the battery unit of the invention;

FIG. 7 is a schematic cross-sectional view of a battery unit according to another embodiment of the battery unit of the invention;

DETAILED DESCRIPTION

Figure 1A:
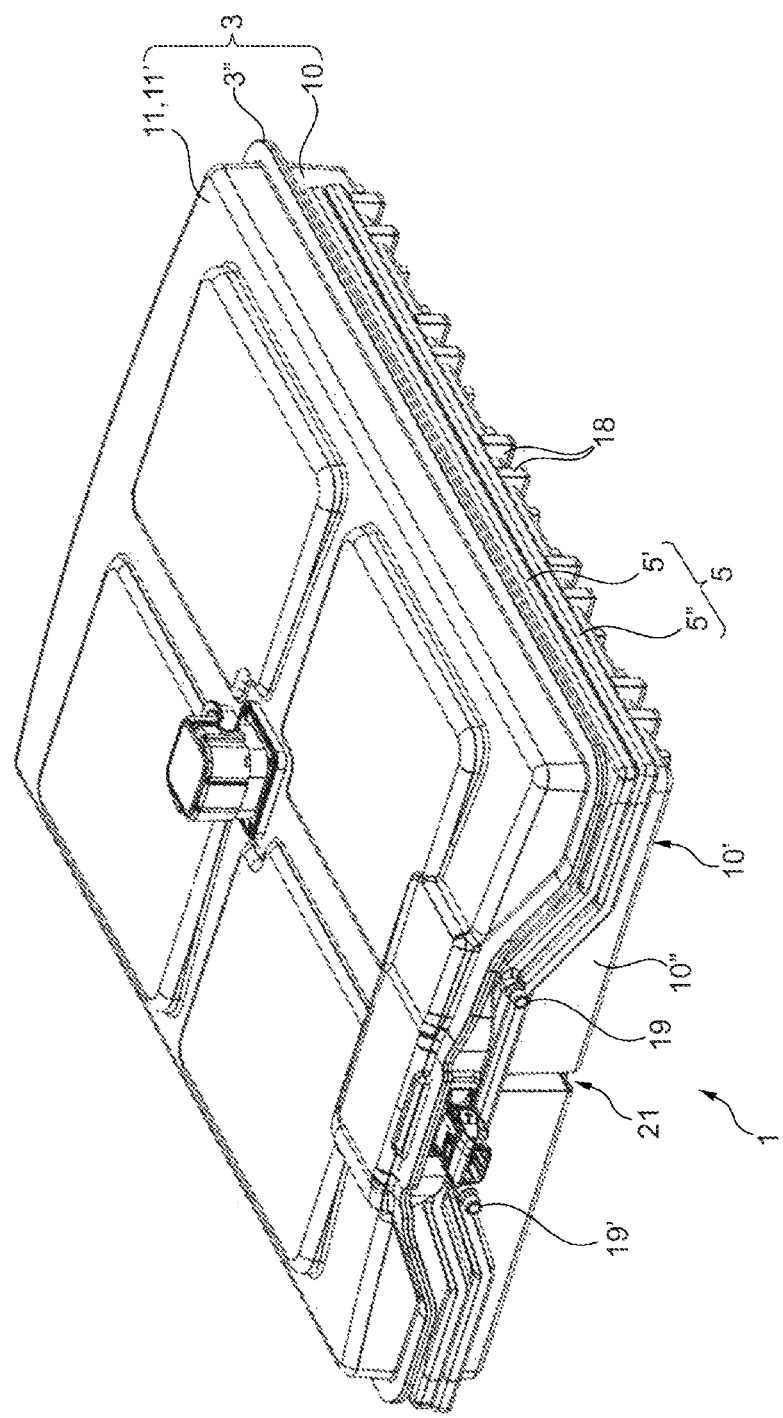
Figure 2:
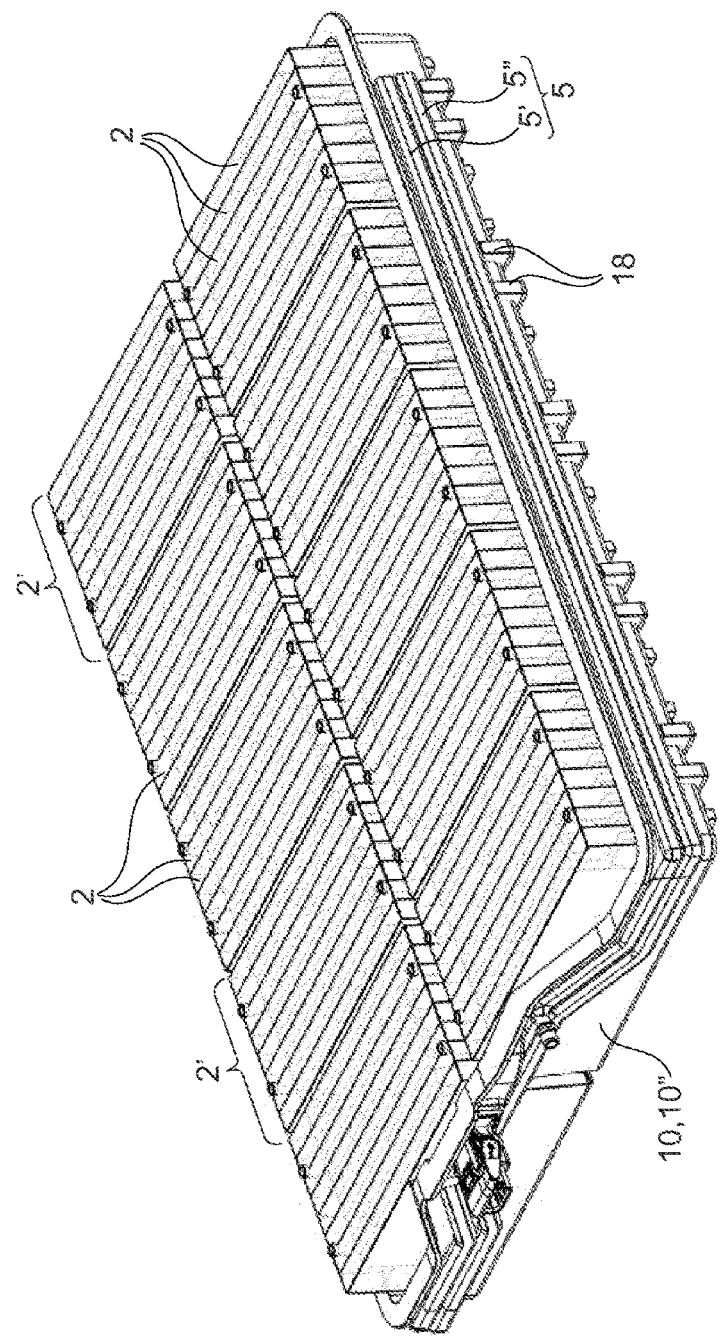
FIG. 2 is a perspective view similar to that of FIG. 1A, the cover being removed.

FIGS. 1, 3, 7, 14, 15 and 17 notably show a battery unit 1, notably for a hybrid and/or electric motor vehicle, essentially comprising, on the one hand, a plurality of battery cells 2 or elements, if necessary grouped together physically and/or electrically in several blocks or modules 2', on the other hand, a housing 3 accommodating and surrounding said cells or elements 2 and, finally, means 4, 5 for regulating the temperature of said cells or elements 2 by circulation of heat-transfer fluid FC.

In accordance with the invention, the housing 3 comprises, at least in a bottom region 6 on which the cells 2 are arranged, at least one, preferentially several, heat exchange zone(s) 6' between said cells 2 and the heat-transfer fluid FC, said zone or zones 6' being incorporated in the structure of said housing 3, preferentially in the wall 3' thereof.

Thus, because of the incorporation of at least a part of the temperature regulation means 4, 5 (here at least the heat exchange zones 6') in the very structure of the housing 3, a compact construction is achieved (maximum internal volume, minimum external volume), with a limited number of components and parts to be assembled (only the constituent parts 10, 11 of the housing 3 have to be mutually secured, the heat exchange zone or zones 6' being incorporated in said parts of housing 3).

Preferentially, the or each exchange zone 6' comprises a surface element 7 with high thermal conductivity in contact with cells 2, on the one hand, and the heat-transfer fluid FC, on the other hand, a surface element 7 being, if necessary, associated with the cells 2 of a module 2'.

The heat exchange zones 6' can thus constitute means for regulating the temperature of the cells 2 which not only are incorporated in the very structure of the housing 3, but can also be organized and segmented according to the organization and possible grouping together of the cells 2 (in modules 2'), for an optimized heat transfer efficiency.

In accordance with an advantageous constructive feature of the invention, emerging notably from FIGS. 4 to 13 and 17, the or each exchange zone 6' comprises a volume 8 for circulation of heat-transfer fluid FC, defined between a surface element 7 with high thermal conductivity, in direct contact with cells 2, and a surface element 9 with low thermal conductivity, if necessary in contact with the outside environment.

Thus, the heat exchange with the fluid FC of the volume 8 is highly favored at the surface element 7 and, on the contrary, reduced to the maximum at the complementary surface element 9.

A high thermal conductivity, and more generally a good heat transfer between the fluid FC and the cells 2, can be achieved by using a material that is intrinsically a good thermal conductor and used in small thickness, in connection with a maximum contact surface area and an optimized contact quality between the surface element 7 and the cells 2, if necessary of the module 2' concerned.

The low thermal conductivity, for its part, can be achieved by using a material that is a weak thermal conductor, even thermally insulating, in combination with a relatively great thickness of the wall of the surface element 9.

Typically, high thermal conductivity $\lambda$ is understood herein to mean values of $\lambda$ such that $\lambda > 50$ W·m$^{-1}$·K$^{-1}$, preferentially $\lambda > 100$ W·m$^{-1}$·K$^{-1}$ and low thermal conductivity $\lambda$ is understood to mean values of $\lambda$ such that $\lambda < 1$ W·m$^{-1}$·K$^{-1}$, preferentially $\lambda < 0.5$ W·m$^{-1}$·K$^{-1}$.

According to an advantageous embodiment of the invention, the surface element 7 with high thermal conductivity is an element added in the housing 3, and advantageously consists of a metal plate, or of a similar material that is rigid and a good thermal conductor, fluid-tightly secured with a surface element 9 with low thermal conductivity.

The material of the surface element 7, preferentially aluminum, can also be non-metallic, and for example consist of a thermoplastic or thermoset material, filled with additive to increase its thermal conductivity.

The surface element 7 can, as a variant, also be of supple or flexible nature to be adapted to and make up for the flatness defects of the modules 2', while being a good thermal conductor (element 7 made of silicone for example, preferentially filled).

The or each thermally conductive plate 7, in addition to an optimized heat exchange with the cells 2 (possibly only of the module 2' which is assigned to it), will have to tightly delimit an elementary volume 8 for circulation of fluid FC in connection with a surface element 9, and withstand the deformations induced by the temperature variations, in order to permanently maintain an optimal surface contact with the cells 2. Its securing and its assembly with the housing 3 and with the paired surface element 9 are therefore advantageously both peripheral and, at least on an ad hoc basis, distributed over its surface.

As FIGS. 6 and 7 schematically show, the housing 3 can comprise only a single heat exchange zone 6' (only in the bottom tray 10—FIG. 6) or a single heat exchange zone 6' in each of its constituent parts (for example one zone 6' in the bottom tray 10 and one zone 6' in the cover 11—FIG. 7).

However, preferably, the housing 3 comprises a plurality of heat exchange zones 6' in one, several or each of its constituent parts (tray 10, cover 11), each zone 6' being advantageously assigned to a module 2' (see FIGS. 3, 4, 8, 9, 11 and 16).

In accordance with another advantageous constructive feature, the surface element 9 with low thermal conductivity of the or each exchange zone 6' forms an integral part of the housing 3 and advantageously constitutes a portion of the wall 3' thereof.

Thus, the surface elements 7 and 9 constitute, by cooperation, regions of wall 3' with double-wall structure of the housing 3, these regions of wall with double skin corresponding to the heat exchange zones 6' and enclosing the incorporated volumes 8 for circulation of heat-transfer fluid FC.

Advantageously, and as FIGS. 10 to 12 and 15 to 17 for example show, the circulation volumes 8 of the heat exchange zone or of the different heat exchange zones 6' form portions of one or more circuits 4 for circulation of heat-transfer fluid FC, incorporated in the structure of the housing 3, said portions of circuit 4 being fluidically linked in series, or not, and connected to distribution/collection ducts 5', 5" forming part of a circuit 5 for supplying/discharging heat-transfer liquid fluid FC, these circuits 4 and 5 constituting the means for regulating the temperature of the cells 2.

In accordance with a preferred constructive variant of the invention, emerging notably from FIGS. 1, 3, 7, 14, 15 and 17, the housing 3 is made of a rigid material with low thermal conductivity, preferentially of plastic, and it is composed, on the one hand, of a bottom tray 10, with a bottom wall 10' and lateral walls 10", and of a top cover 11, assembled peripherally, preferentially by screwing, and possibly with the interposition of a seal.

An embodiment of the housing 3 made of a rigid plastic material (thermoplastic material filled or not with additives and/or fibers, for example polypropylene, polyamide, polyester, etc.) and in two parts 10 and 11 assembled peripherally, makes it possible to achieve simultaneously (by comparison to metallic housings) a better thermal insulation and a reduction of the cost prices, and allows for a wide variety and diversity of forms that can be produced.

The tight assembly zone of the tray 10 with the cover 11 can consist of a continuous peripheral contact strip 3" obtained by pressurized application of the respective edges of the tray and of the cover, or possibly by material fusion between the edges facing one another and with complementary configurations of the two constituent parts 10 and 11 of the housing 3.

A removable assembly by screwing, clipping or the like will be preferred because it allows for the cover 11 to be removed for test and maintenance operations and for replacement of cell(s) 2, or of module(s) 2'.

Furthermore, a compression seal is, as is known, inserted between the two edges in contact in the assembly zone 3".

According to a feature of the invention, provision is made for the bottom tray 10 to have formations or depressions in its bottom wall 10', and possibly in at least some of its lateral walls 10", these formations or depressions each constituting a surface element 9 with low thermal conductivity and forming, each in cooperation with a surface element 7 with high thermal conductivity, in the form of a plate or in contact with cells 2, for example all the cells 2 of a module 2', heat exchange zones 6' each with a volume 8 for circulation of heat-transfer fluid FC.

This tray 10 can also, as a variant and as FIGS. 6 and 7 show, have only a single plate 7 and a single zone 6' in its bottom region 6.

Figure 3:
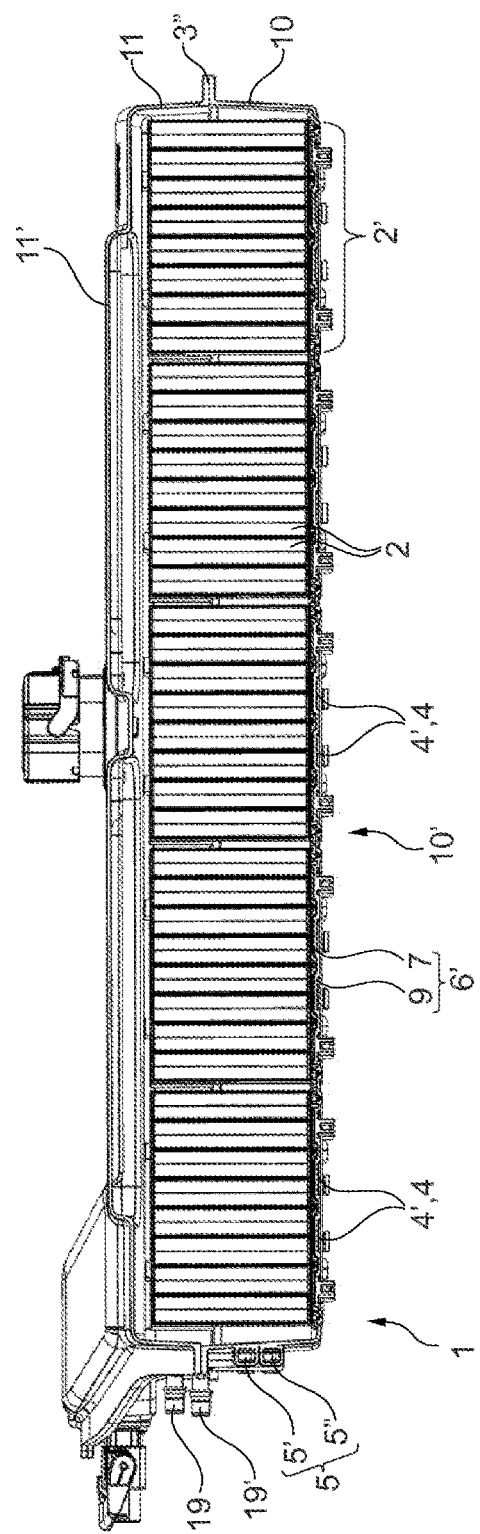
FIG. 3 is a total cross-sectional view of the battery unit represented in FIGS. 1 and 2.

In order to increase the cell regulation possibilities, by increasing the heat exchange interfaces and the available heating/cooling power, provision can be made for the cover 11 also to incorporate, in its structure, one or more heat exchange zones 6' between at least some, preferentially all, of the cells 2 and the heat-transfer fluid FC. The or each heat exchange zone 6' of the cover 11 can comprise a volume 8 for circulation of heat-transfer fluid FC and be composed by the cooperation of a formation or depression of the wall 11' of the cover 11, constituting a surface element 9 with low thermal conductivity, with a surface element 7 with high thermal conductivity, in the form of a plate and in contact with cells 2, for example all the cells 2 of a module 2' (FIGS. 3 and 7). The double-wall construction of the cover 11 can thus be similar to that of the tray 10.

In order to be able to compensate for the probable assembly plays of the different parts 10, 11 of the housing 3 so as not to compromise the heat transfer performance levels between the cells 2 and the heat-transfer fluid FC, in particular at the cover 11, a flexible and thermally conductive sheet or leaf 12 is inserted between the surface element or elements 7 with high thermal conductivity of the heat exchange zone or zones 6' incorporated in the cover 11, in the bottom 6' of the tray 6 and/or in the lateral walls 10" of the tray 10, on the one hand, and the faces concerned of the cells 2 of the facing modules 2', on the other hand.

If necessary, as a variant, each surface element 7 in the form of a plate can be coated with an individual layer of material with high thermal conductivity, such as, for example, filled silicone.

Figure 16:
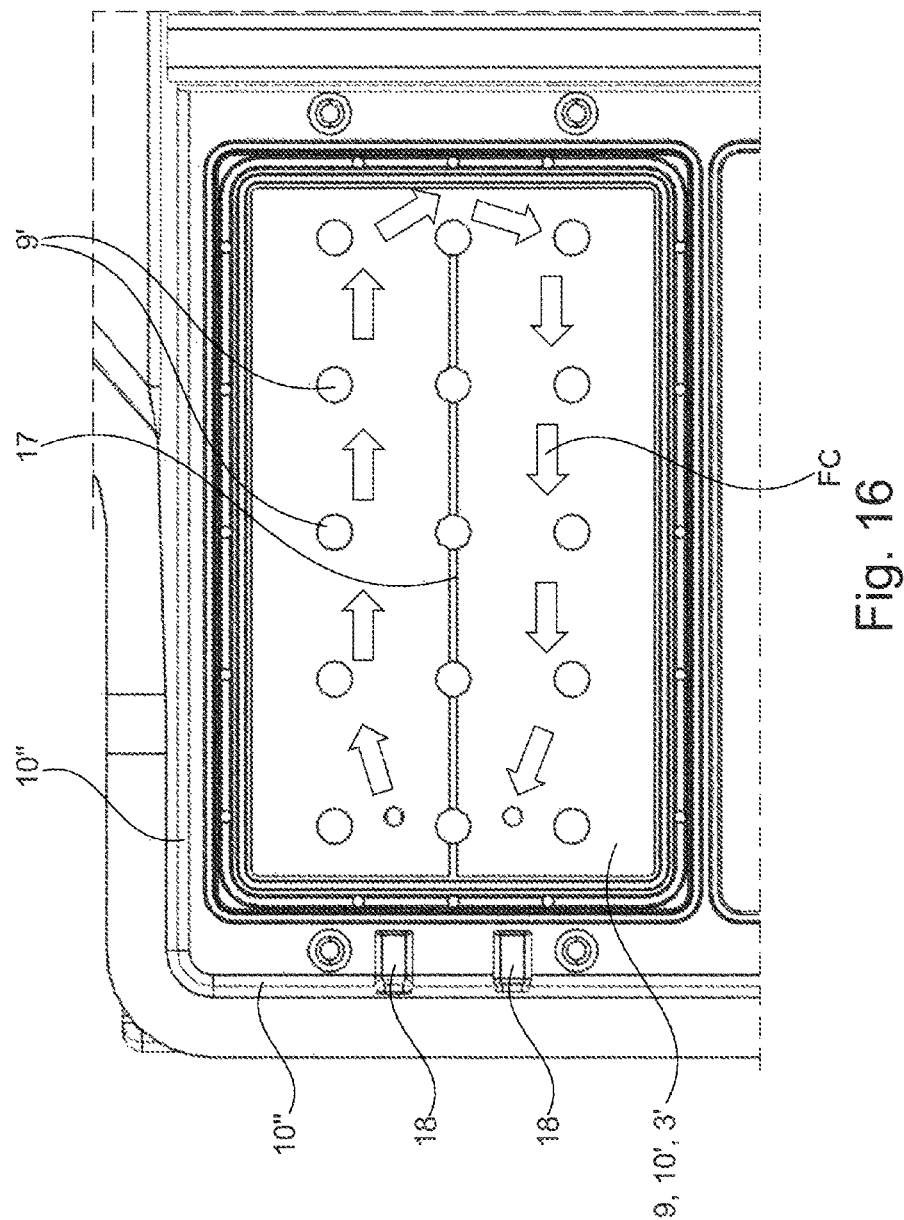
Figure 17:
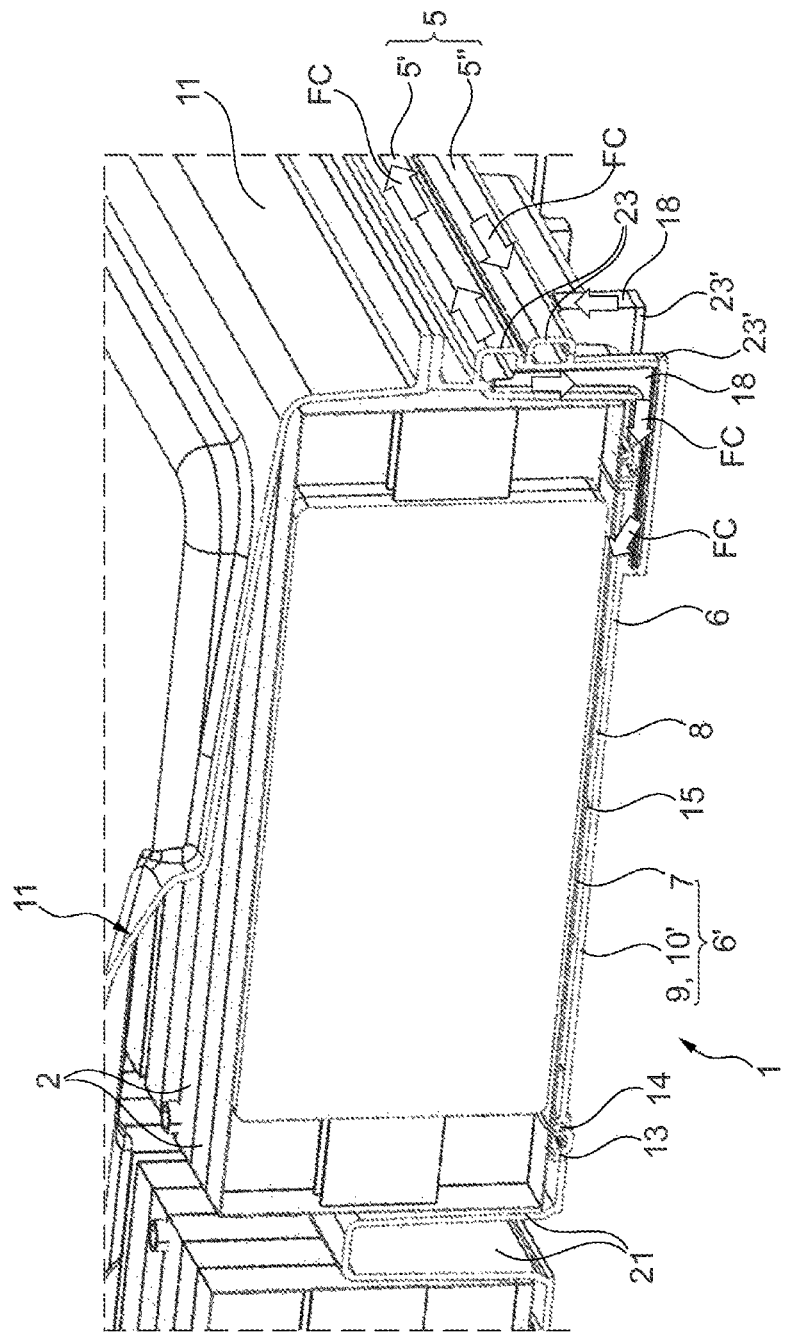
FIG. 17 is a partial view in transverse cross section of the battery unit represented in FIGS. 1A and 1B, illustrating the circulation of the heat-transfer fluid in the supply/discharge ducts, the tapping lines and the heat exchange zones.

As FIG. 16 shows, each heat exchange zone 6' comprises a volume 8 for circulation of heat-transfer fluid FC forming a portion of U-shaped or serpentine circuit, in which the two free ends of the two branches are fluidically linked to distribution/collection lines 5', 5" forming part of a circuit 5 for supplying/discharging heat-transfer fluid FC.

The U-shaped or serpentine circulation volumes 8 (not represented) are all fluidically linked:
either individually in series and collectively to the circuit 5 (not represented);
or individually and in parallel to this circuit 5 (FIGS. 8 to 11 and 17).

According to a first variant embodiment of the invention, each surface element 7 with high thermal conductivity, in the form of a plate, is secured by mechanical attachment with the wall 3' of the housing 3, for example by heading, by snap-fitting, by crimping, by screwing or the like, the portion of wall 3' facing the surface element 7 constituting a surface element 9 with low thermal conductivity.

According to a second variant embodiment of the invention, emerging from FIGS. 4, 5 and 11 to 13, each surface element 7 with high thermal conductivity, in the form of a plate, comprises an edge zone forming a peripheral frame 13, in a single piece or added by overmolding, secured by welding with the wall 3' of the housing 3, the portion of wall 3' facing the surface element 7 constituting a surface element 9 with low thermal conductivity. Such a frame 13 notably makes it possible to establish a continuous bond over the perimeter, preferentially by laser welding.

Advantageously, a seal 14 is present, in the compressed state, between the mutually secured peripheral edges of the two surface elements 7 and 9 (by being, for example, received in a groove of the tray 10).

Figure 11:
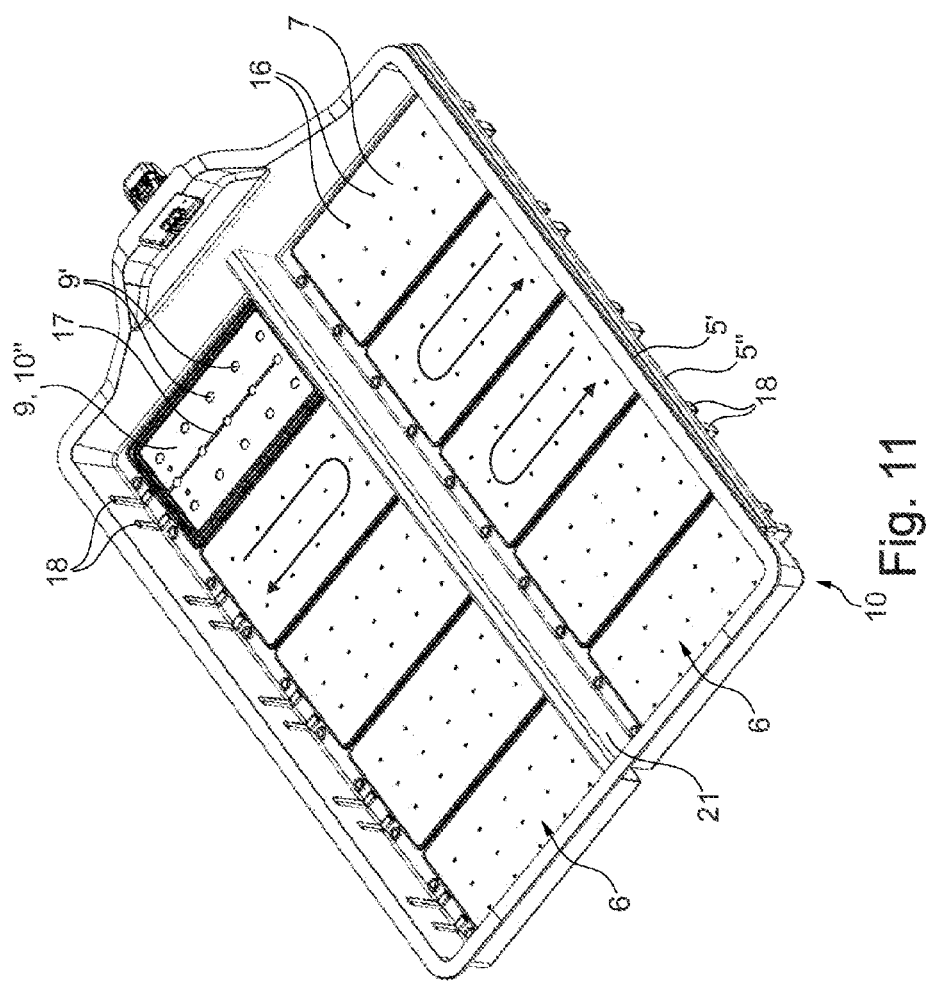
FIG. 11 is a view similar to that of FIG. 8 after removal of a plate that is thermally conductive or has high thermal conductivity from a heat exchange zone incorporated in the bottom tray.
Figure 12:
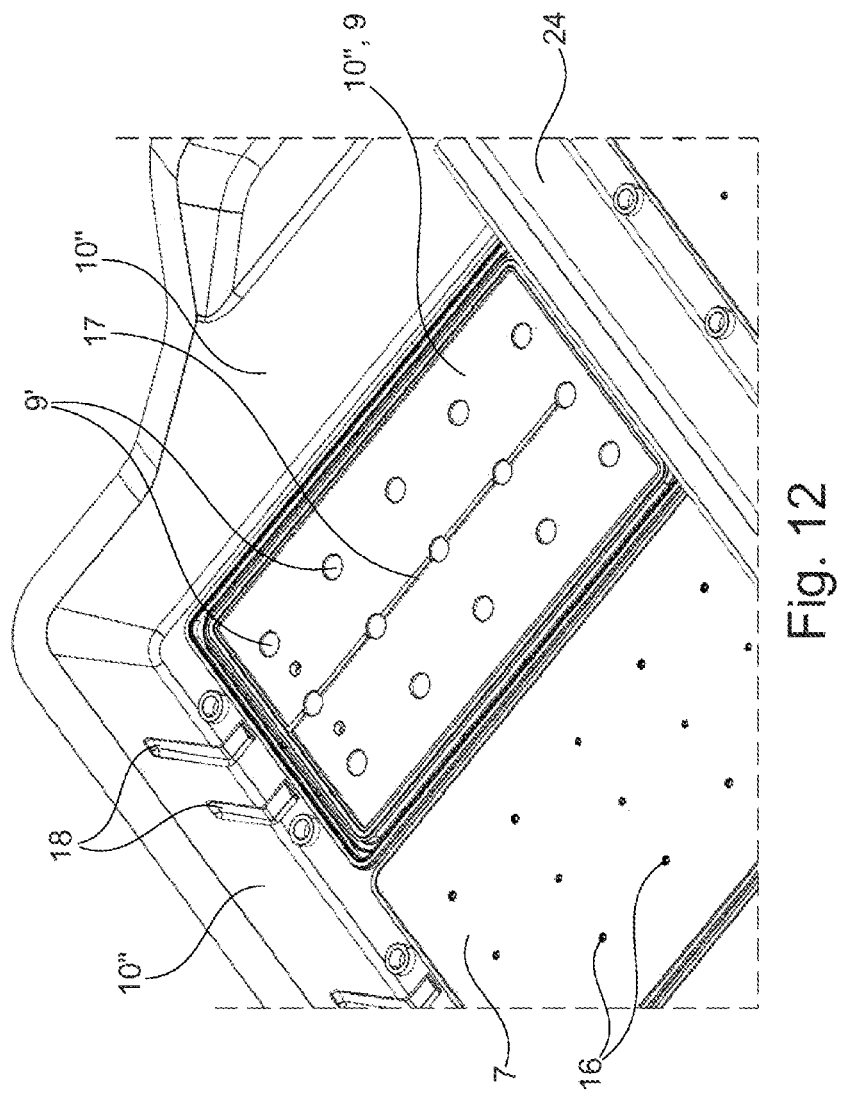
FIG. 12 is a view of a detail (depression of the heat exchange zone from which the conductive plate has been removed) of FIG. 11, to a different scale.
Figure 13:
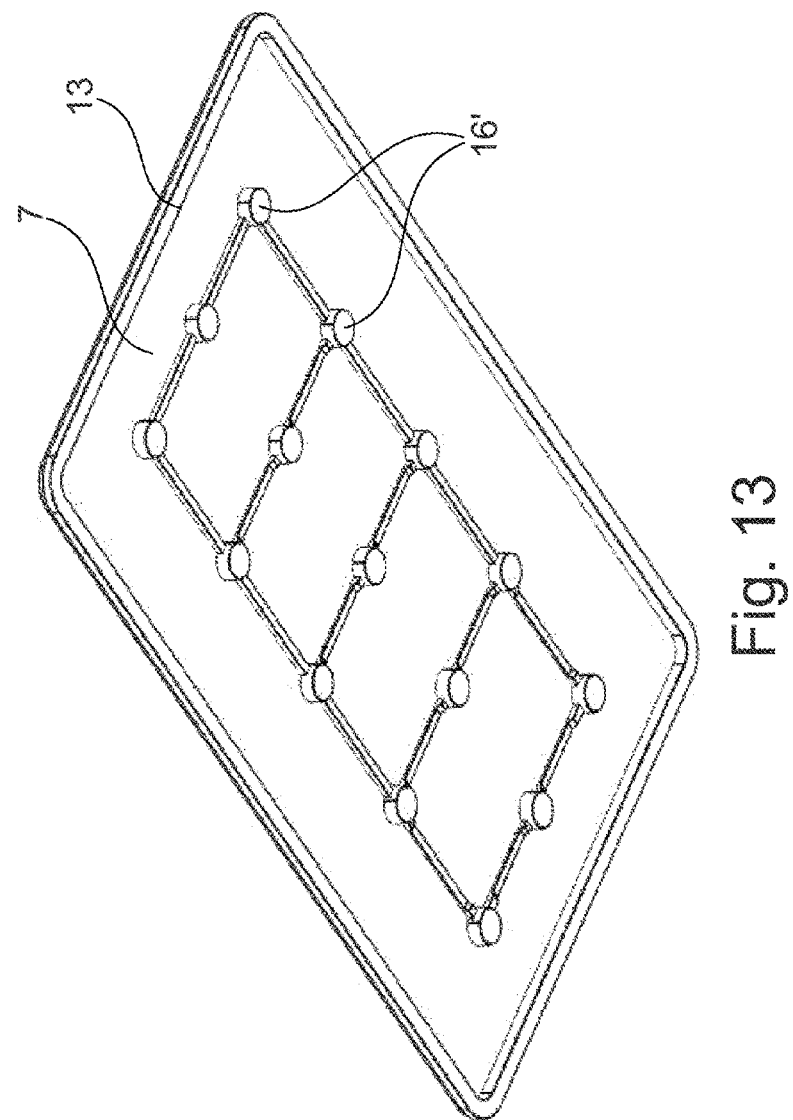
FIG. 13 is a perspective bottom view of a plate with high thermal conductivity of a heat exchange zone.
Figure 14:
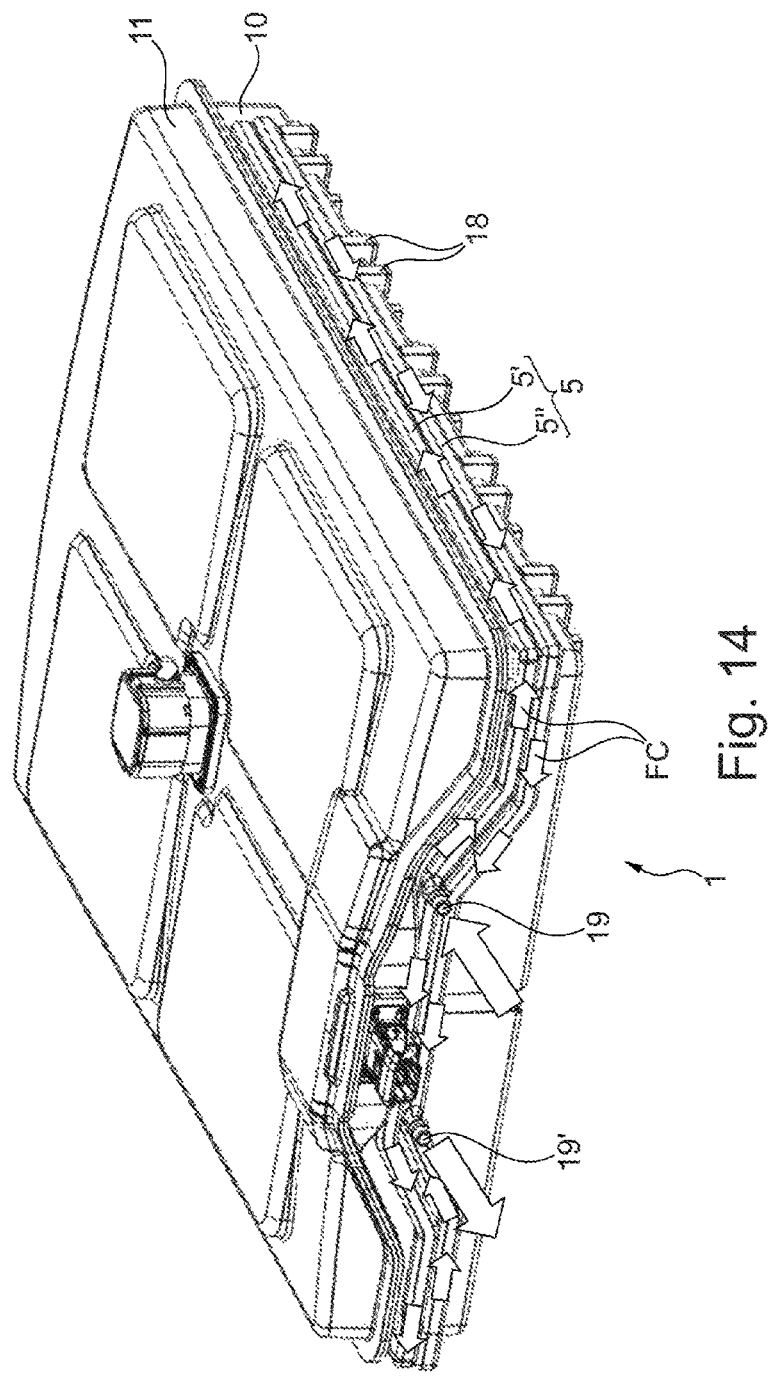
FIGS. 14 to 16 are views respectively identical to FIGS. 1A, 1B and 1C illustrating the circulation of the heat-transfer fluid in the supply and discharge ducts (FIGS. 14 and 15), in the tapping lines (FIG. 15) and in the internal volume of a heat exchange zone forming a portion of U-shaped elementary circuit (FIG. 16)
Figure 15:
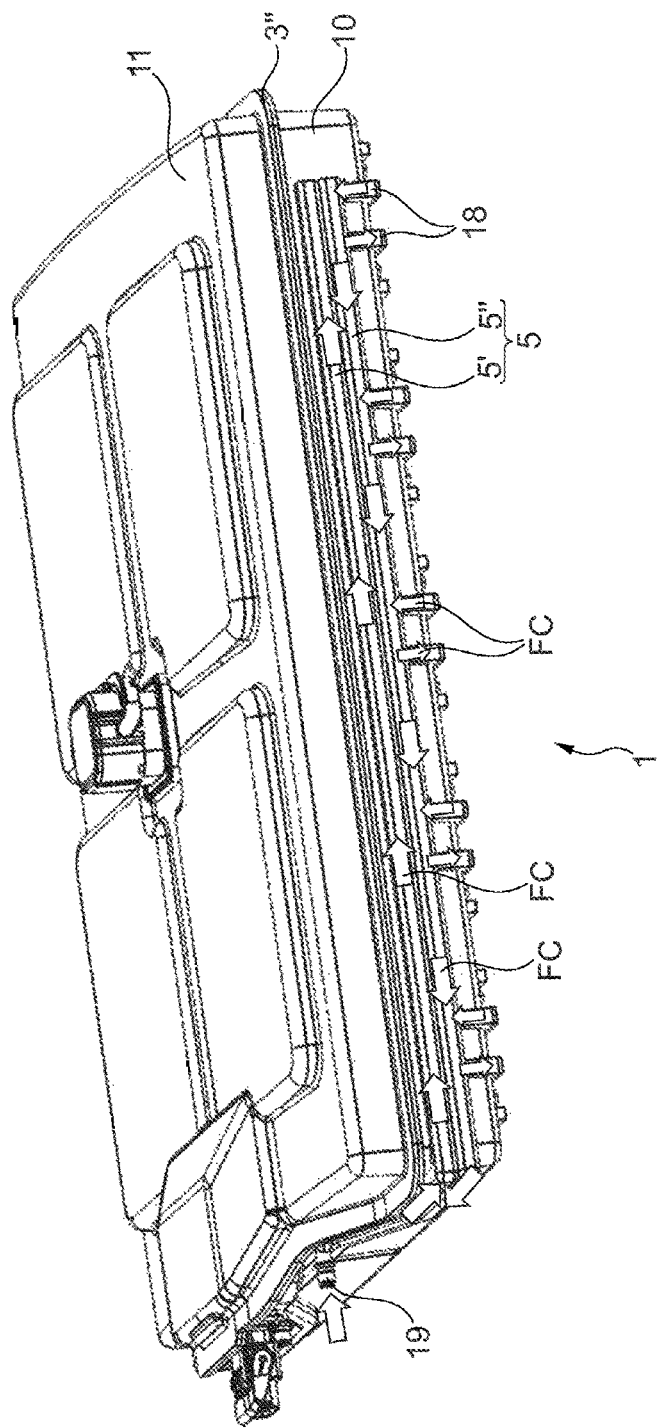

Preferably, and as is illustrated by way of example in FIGS. 11 to 13, each surface element 7 with high thermal conductivity in the form of a plate is secured with the wall 3' of the housing 3, on the one hand, peripherally, preferentially continually and for example by mechanical attachment or welding, and, on the other hand, in at least one bonding zone 15 situated inside the surface of said plate 7, advantageously in a plurality of bonding zones 15 distributed over the surface of said plate 7, preferentially regularly.

Thus, in addition to a peripheral fixing, the or each plate 7 is also rigidly secured at a plurality of scattered points or zones 15. The result thereof is a distributed fixing which avoids any deformation of the plate or plates 7 under the effect of the heat, and also under the effect of the weight of the cells 2 (for the plates 7 of the tray 10—the zones 15 also forming bearing points), making it possible to ensure over time an optimal surface contact between plate(s) 7 and cells 2.

Because of this, each plate 7 is secured peripherally along its outline (possibly continually) and inside this outline (locally by spots for example) favoring its resistance to thermal variations and to deformations.

It is also possible thereby to provide a mechanical attachment by local overmolding of the metal plate 7 with a material compatible with that of the tray 6 for a securing by welding.

Figure 4:
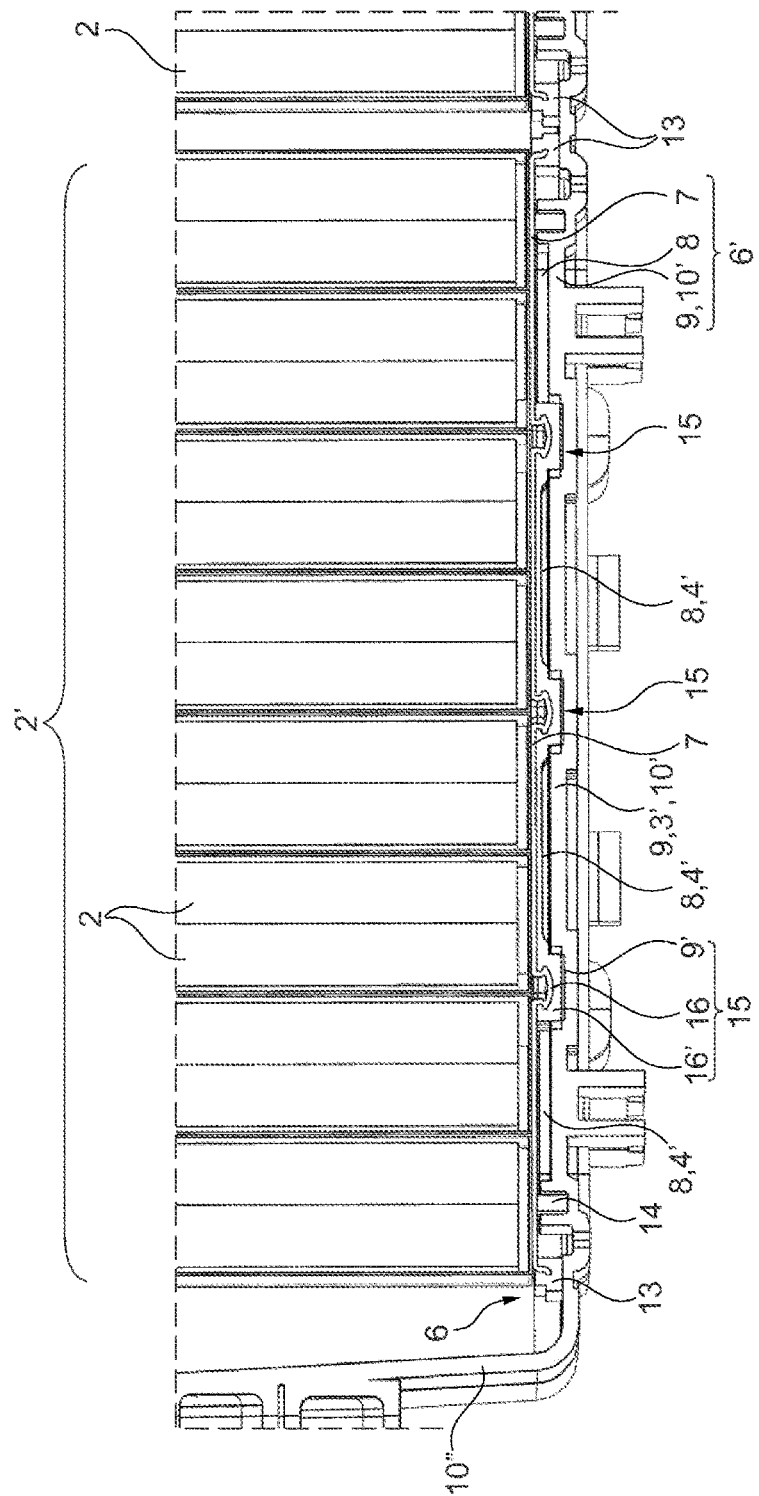
FIG. 4 is a representation of a part of the representation of FIG. 3 to a different scale.

In accordance with an advantageous practical embodiment emerging from FIGS. 4 and 5 in particular, each surface element 7 with high thermal conductivity and in the form of a plate, is secured with a portion of the wall 3' of the housing 3 constituting a surface element 9 with low thermal conductivity, and is so secured in at least one bonding zone 15, preferentially a plurality of bonding zones 15 distributed regularly. Each bonding zone 15 consists of a local deformation 16, protruding toward the portion of wall 3', of the surface element 7 in the form of a metal plate, said deformation 16 being overmolded by a material 16' compatible with the material of said portion of wall 3' for a bond by laser welding for example.

These bond points 15 in the form of local prominent formations made of plastic material 16' having a metal core 16 can, for example, come to be bearingly engaged in depressed local formations 9' formed in the portion of wall 3' constituting the surface element 9, to produce as many spot mechanical bonds.

Despite the presence of possible strips of material between points 16' (evolving from the overmolding process), a path for circulation of fluid FC in the exchange zone 6' concerned is formed between the two surface elements 7 and 9, in the volume 8 that they delimit between them.

Advantageously, provision can be made for one of the two facing surface elements 7 and 9, defining between them a volume 8 for circulation of heat-transfer fluid FC of a heat exchange zone 6', advantageously of rectangular form, to have a rib 17 subdividing said volume 8 into two branches of an elementary portion of U-shaped, S-shaped or serpentine circulation circuit 4'.

Although this form of elementary circulation circuit 4' is preferred because of its production simplicity, large exchange surface area and circulation path suited to an easy circulation, other forms are also possible, such as serpentine, S-shaped, Z-shaped or the like.

As also emerges from FIGS. 1 to 3, 8 to 12 and 14 to 17, the temperature regulation means 4, 5 comprise distribution 5'/collection 5" ducts constituting one or more circuits for supplying/discharging heat-transfer liquid fluid LC, these ducts 5', 5" being structurally incorporated in the housing 3, and secondary or tapping lines 18 linking said ducts 5', 5" to the circulation volumes 8 of the heat exchange zones 6', these ducts 5', 5" and lines 18 being at least partially formed in a single piece with the wall 3' of the housing 3.

The incorporation of the ducts 5', 5" and lines 18 can thus be produced at least partially during manufacture of the tray 10 and of the cover 11 and makes it possible to dispense with the provision and tedious tight connection of ducts and hoses, while also avoiding the exposure of these means to the outside environment (distribution means attached against the wall 3').

Advantageously, the tubular walls of the ducts 5', 5" and of the lines 18 are formed, on the one hand, partially in and/or on the wall 3' of the housing 3, preferentially of substantially rectangular parallelepipedal general form, and, on the other hand, partially by overmolded material 23, 23' and/or portions of wall added and assembled by vibration or laser welding.

The distribution and the cutting of said tubular walls, between their parts formed by the wall 10', 10" of the tray 10 and their parts added by portions or by overmolding 23, 23', depend on the possibilities of the mold for molding the tray 10 and on the complexity of configuration of the tray 10 itself, and, if necessary, of the cover 11.

As FIG. 1 notably show, the or each supply/discharge circuit 5 comprises a connection end-fitting 19 for the distribution duct or ducts 5' and a connection end-fitting 19' for the collection duct or ducts 5", a common circuit 5 or separate circuits 5 being advantageously provided for the circulation volumes 8 of the heat exchange zones 6' present in the bottom tray 10 and the cover 11 which form the two constituent parts of the housing 3.

Figure 18:
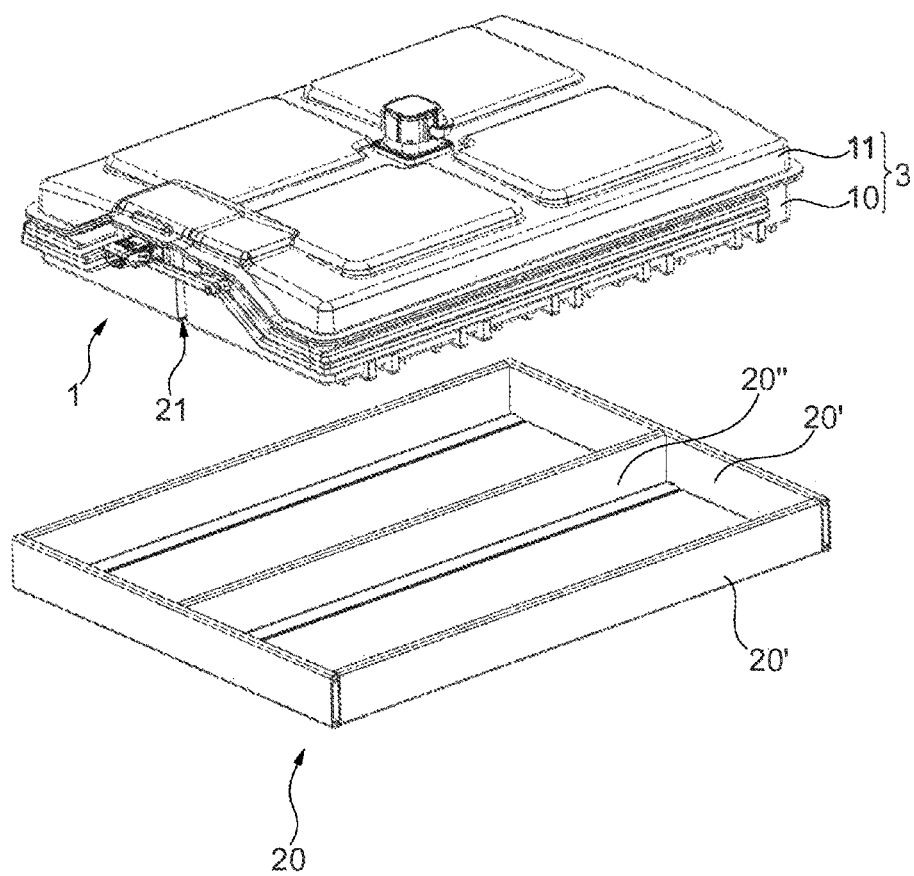
FIG. 18 is a view similar to FIG. 1A showing also a reinforcing frame intended to be fitted around and in the bottom tray of the housing of the battery unit.

In order to give the tray 10 an enhanced mechanical strength and rigidity, notably given the significant weight that the cells 2 can represent, provision can be made for the tray 10 to comprise:
- a reinforcing structure incorporated in the body of the tray 10, for example overmolded by thermoplastic material constituting the wall of said tray 10, and/or,
- a reinforcing structure 20 cooperating externally, by conjugation of forms, with the thermoplastic wall of said tray 10, for example of frame type notably providing said tray 10 with a median and peripheral stiffening (FIG. 18). This frame 20 can comprise lateral walls 20' and a median spacer 20".

Furthermore, to structurally reinforce the bottom 10' of the tray 10 and possibly provide an additional wall surface for the formation of heat exchange zones 6', the tray 10 can also comprise at least one subdividing internal wall 21, extending in a single piece from the bottom of the tray 10, advantageously cooperating with a reinforcing structure 20 and incorporating, if necessary, volumes 8 for circulation of heat-transfer fluid FC, these volumes 8 preferentially forming part of the circulation means 4 of the tray 10 and fluidically linked to the distribution means 5 (FIGS. 8, 9, 11 and 17).

Said subdividing wall 21 can be a double wall subdividing the tray 6 into two sub-trays and providing a receiving groove for the spacer 20" of the reinforcing frame 20.

Figure 8A:
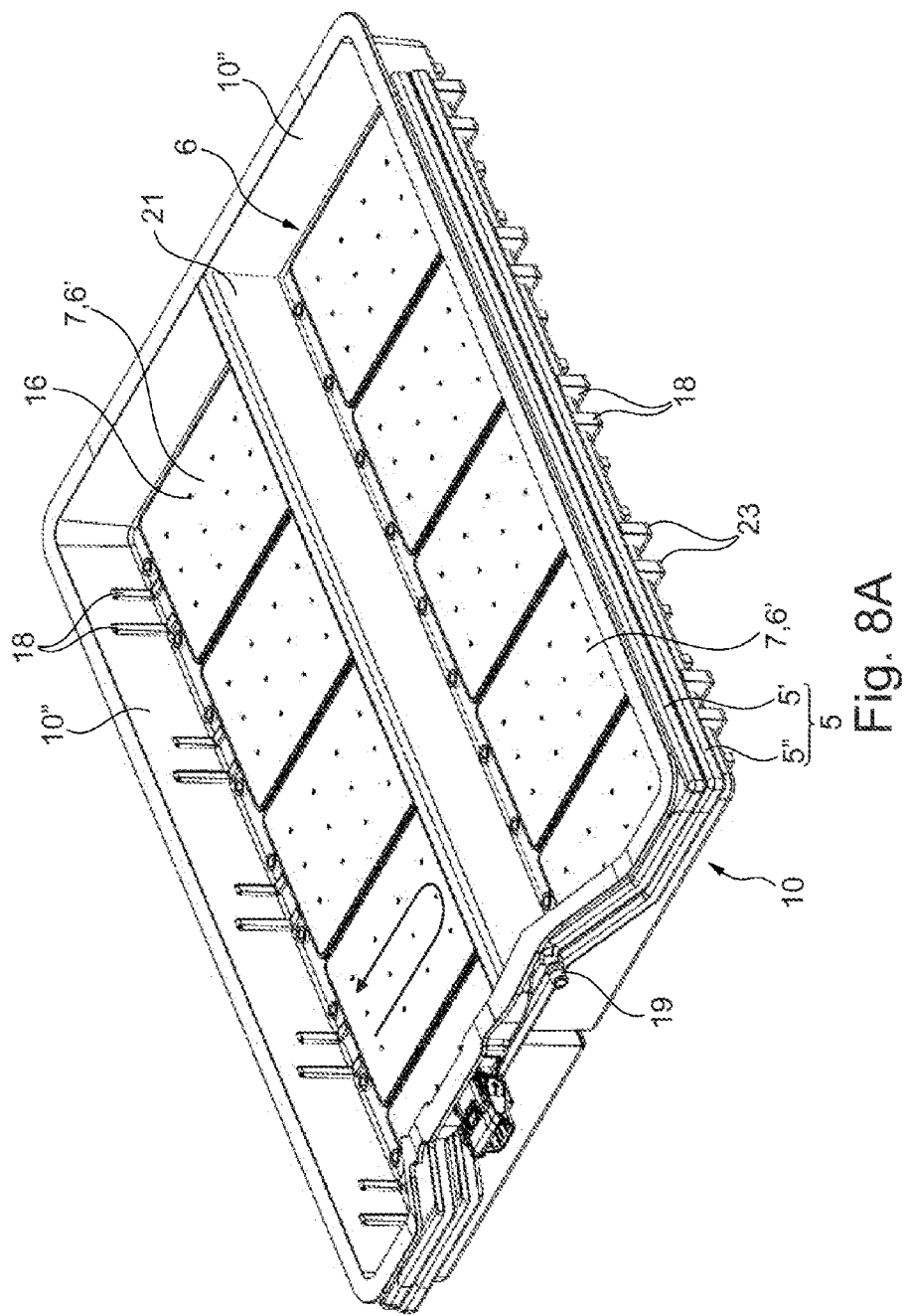
FIG. 8A is a view similar to that of FIG. 2, the battery cells or elements being removed and only the bottom tray being represented.
Figure 8B:
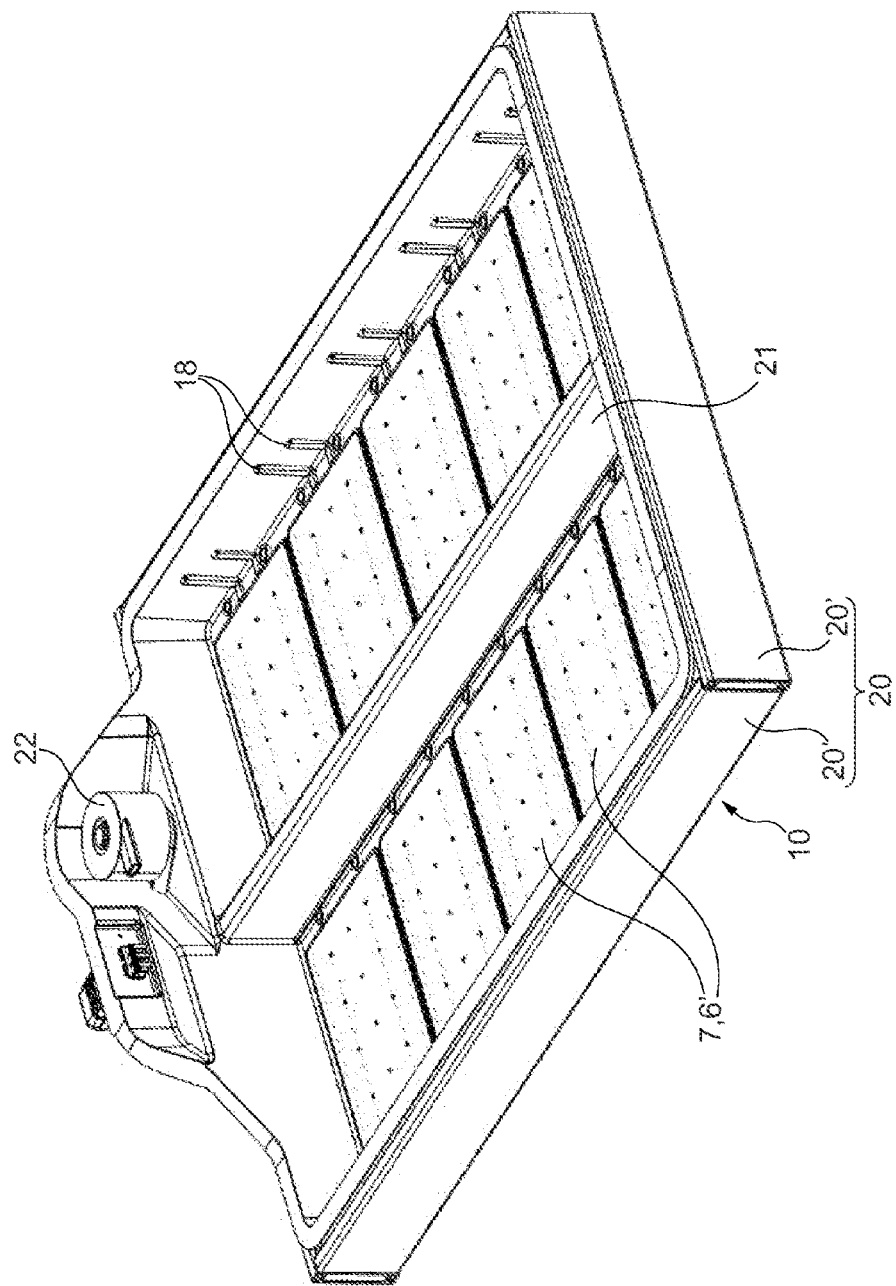
FIG. 8B is a view similar to that of FIG. 8A illustrating another variant embodiment of the tray, the cells being removed and a reinforcing frame being added on the tray.
Figure 9:
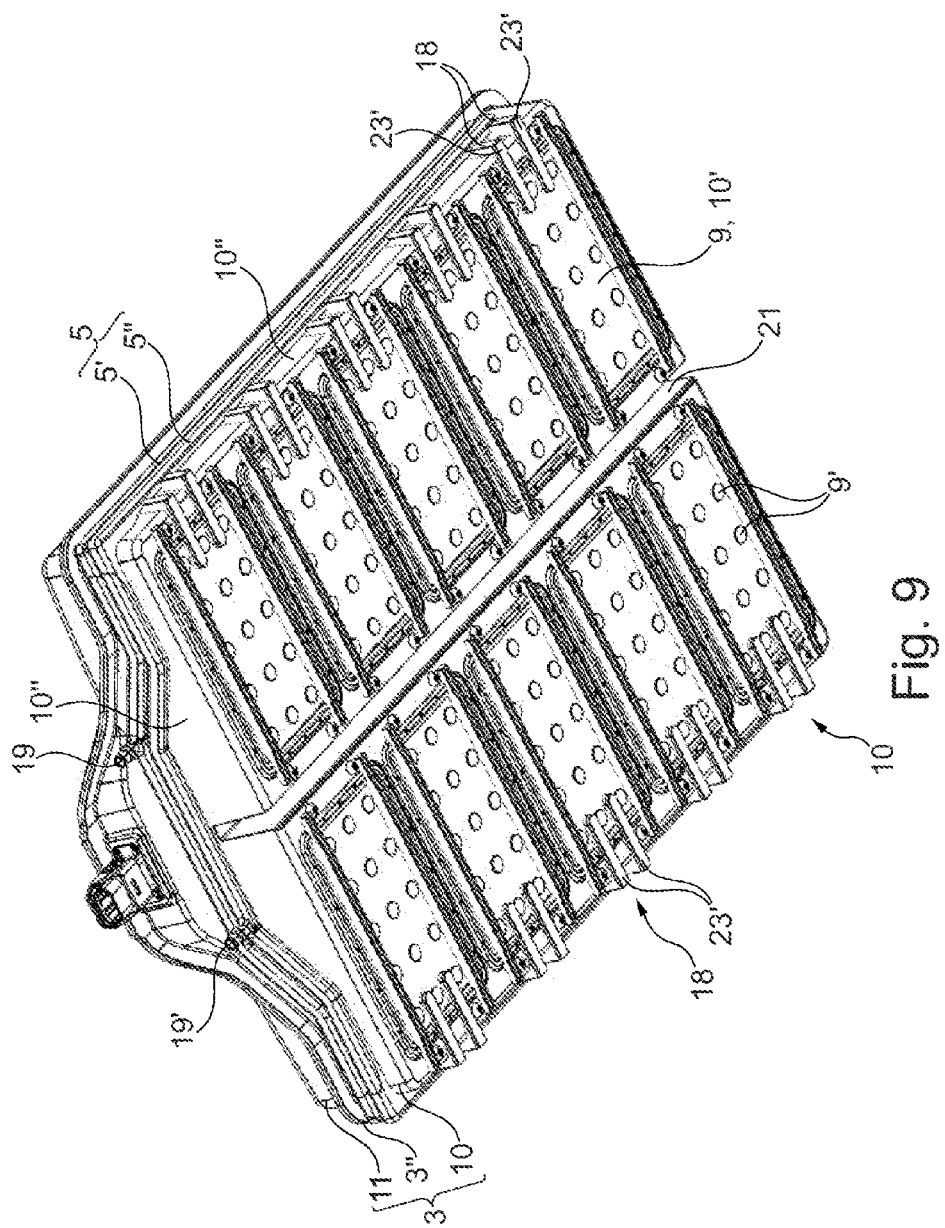
FIG. 9 is a perspective bottom view of a battery unit represented in FIGS. 1A and 1B.
Figure 10:
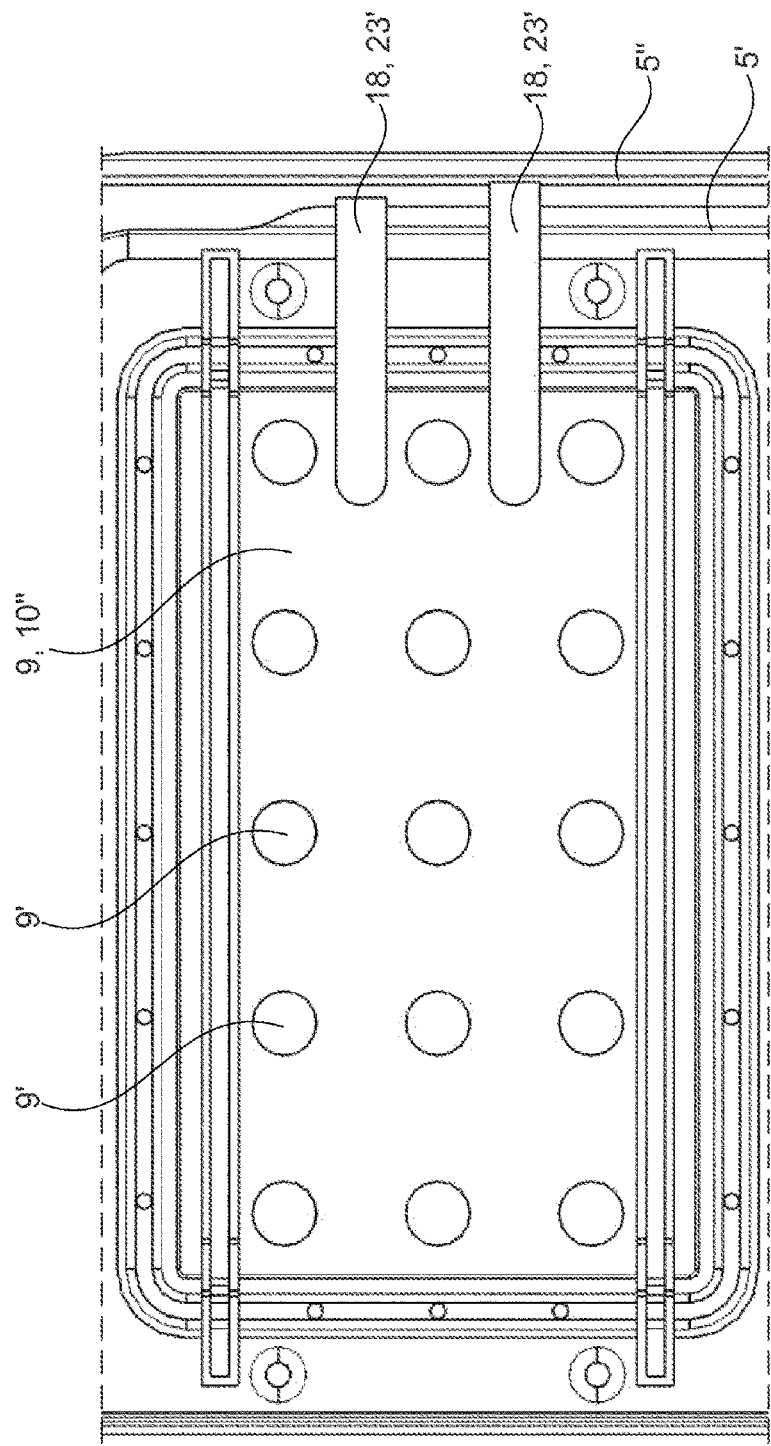
FIG. 10 is a view to a different scale of a detail of FIG. 9.

Moreover, a means 22 for controlling the temperature, the circulation and/or the distribution of the heat-transfer liquid is incorporated structurally, even materially, at least partly in the housing 3 (see FIG. 8B—partial incorporation of a water pump).

Finally, the invention relates also to a motor vehicle, in particular electric or hybrid, characterized in that it comprises at least one battery unit 1 as described above, this battery unit 1 also comprising at least one internal temperature measurement means, means for electrically connecting cells or elements 2 to one another and external connection means, the latter being advantageously partially formed with or in the wall 3' of the housing 3.

Obviously, the invention is not limited to the embodiments described and represented in the attached drawings. Modifications are still possible, notably from the point of view of the construction of the various elements or by substituting technical equivalents, without in any way departing from the scope of protection of the invention.

The invention claimed is:

1. A battery unit for a hybrid and/or electric motor vehicle, comprising:
- a plurality of battery cells grouped together physically and/or electrically in several blocks or modules,
- a housing accommodating and surrounding said cells and, finally, means for regulating the temperature of said cells by circulation of heat-transfer fluid,
- the housing comprising, at least in a bottom region on which the cells are arranged, at least one zone for exchanging heat between said cells and the heat-transfer fluid, said zone or zones being incorporated in the structure of the said housing,
- the or each exchange zone comprising a surface element with high thermal conductivity in contact with cells, on one side, and the heat-transfer fluid, on its other side,
- the or each exchange zone comprising a volume for circulation of heat-transfer fluid, defined between a surface element with high thermal conductivity, in direct contact with cells, and a surface element with low thermal conductivity, wherein the housing is made of a rigid material with low thermal conductivity and has a bottom tray, with a bottom wall and lateral walls, and of a top cover, in that the bottom region comprises several heat exchange zones each comprising a surface element with high thermal conductivity, each of which is an element added in the housing of material that is rigid and a good heat conductor including metal, liquid-tightly secured to a surface element with low thermal conductivity, and in that each surface element with high thermal conductivity in the form of a plate is secured to the wall of the housing, on one side, peripherally, by mechanical attachment or welding, and, on its other side, in a plurality of bonding zones situated inside the surface of said plate and distributed over the surface of said plate, each of the plates being associated with cells of a module.

2. The battery unit as claimed in claim 1, wherein the surface element with low conductivity of the or each exchange zone forms an integral part of the housing and advantageously constitutes a portion of the wall thereof.

3. The battery unit as claimed in claim 1, wherein the circulation volumes of the different heat exchange zone or zones form portions of one or more circuits for circulation of heat-transfer fluid, incorporated in the structure of the housing, said portions of circuit being fluidically linked in series, or not, and connected to distribution/collection ducts forming part of a circuit for supplying/discharging heat-transfer liquid fluid, these circuits constituting the means for regulating the temperature of the cells.

4. The battery unit as claimed in claim 1, wherein the housing is made of plastic and in that the bottom tray and the top cover are assembled peripherally by screwing, and possibly with the interposition of a seal.

5. The battery unit as claimed in claim 4, wherein the cover also incorporates, in its structure, one or more zones for exchanging heat between at least some of the cells and the heat-transfer fluid, the or each heat exchange zone of the cover comprising a volume for circulation of heat-transfer fluid and being constituted by the cooperation of a formation or depression of the wall of the cover, constituting a surface element with low thermal conductivity, with a surface element with high thermal conductivity, in the form of a plate and in contact with cells.

6. The battery unit as claimed in claim 1, wherein each heat exchange zone comprises a volume for circulation of heat-transfer fluid forming a portion of a U-shaped or serpentine circuit, in which two free ends of two branches are fluidically linked to distribution/collection lines forming part of a circuit for supplying/discharging heat-transfer fluid.

7. The battery unit as claimed in claim 1, wherein each surface element with high thermal conductivity, in the form of a plate, is secured by mechanical fastening to the wall of the housing, by any one of heading, snap-fitting, crimping, and screwing, the portion of wall facing the surface element constituting a surface element with low thermal conductivity.

8. The battery unit as claimed in claim 1, wherein in each surface element with high thermal conductivity, in the form of a plate, comprises an edge zone forming a peripheral frame, made of a single piece or added by overmolding, secured by welding to the wall of the housing, the portion of wall facing the surface element constituting a surface element with low thermal conductivity.

9. The battery unit as claimed in claim 7, wherein a seal is present, in the compressed state, between mutually secured peripheral edges of two surface elements.

10. The battery unit as claimed in claim 1, wherein each surface element with high thermal conductivity and in the form of a plate is secured to a portion of the wall of the housing constituting a surface element with low thermal conductivity, and is so secured in at least one bonding zone, each bonding zone having a local deformation, protruding toward the portion of wall, of the surface element in the form of a metal plate, said deformation being overmolded by a material compatible with the material of said portion of wall for a bond by laser welding.

11. The battery unit as claimed in claim 1, wherein one of two facing surface elements, defining between them a volume for circulation of heat-transfer fluid of a heat exchange zone, optionally of rectangular form, has a rib subdividing said volume into two branches of an elementary portion of a U-shaped, S-shaped or serpentine circulation circuit.

12. The battery unit as claimed in claim 1, wherein the temperature regulation means comprise distribution/collection ducts forming one or more circuits for supplying/discharging heat-transfer liquid fluid, these ducts being incorporated structurally in the housing, and secondary or tapping lines linking said ducts to the circulation volumes of the heat exchange zones, these ducts and lines being at least partially formed in a single piece with the wall of the housing.

13. The battery unit as claimed in claim 12, wherein tubular walls of the ducts and of the lines are formed, on one side, partially in and/or on the wall of the housing, optionally of generally substantially rectangular parallelepipedal form, and, on its other side, partially by the overmolded material and/or portions of wall added and assembled by vibration welding or laser welding.

14. The battery unit as claimed in claim 12, wherein the or each supply/discharge circuit comprises a connection end-fitting for the distribution duct or ducts and a connection end-fitting for the collection duct or ducts, a common circuit or separate circuits being advantageously provided for the circulation volumes of heat exchange zones present in the bottom tray and the cover which form two constituent parts of the housing.

15. The battery unit as claimed in claim 1, wherein the tray comprises a reinforcing structure incorporated in the body of the tray overmolded by the thermoplastic material constituting a wall of said tray.

16. The battery unit as claimed in claim 1, wherein the tray comprises a reinforcing structure cooperating externally, by conjoining with a thermoplastic wall of said tray providing a median and peripheral stiffening for said tray.

17. The battery unit as claimed in claim 1, wherein the tray comprises at least one subdividing internal wall, extending in a single piece from the bottom of the tray, advantageously cooperating with a reinforcing structure and optionally incorporating volumes for circulation of heat-transfer fluid, these volumes forming part of the circulation means of the tray and fluidically linked to the distribution means.

18. The battery unit as claimed in claim 1, wherein a means for controlling the temperature, the circulation and/or the distribution of the heat-transfer liquid is incorporated structurally, even materially, at least partly in the housing.

19. A motor vehicle, in particular electric or hybrid, comprising at least one battery unit as claimed in claim 1, this battery unit also comprising at least one internal temperature measurement means, means for electrically connecting the cells or elements to one another and external connection means, the latter being advantageously partially formed with or in the wall of the housing.

20. A battery unit for a hybrid and/or electric motor vehicle, comprising:
a plurality of battery cells grouped together physically and/or electrically in several blocks or modules,
a housing accommodating and surrounding said cells and, finally, means for regulating the temperature of said cells by circulation of heat-transfer fluid,
the housing comprising, at least in a bottom region on which the cells are arranged, at least one zone for exchanging heat between said cells and the heat-transfer fluid, said zone or zones being incorporated in the structure of said housing,
the or each exchange zone comprising a surface element with high thermal conductivity in contact with cells, on one side, and the heat-transfer fluid, on its other side,
the or each exchange zone comprising a volume for circulation of heat-transfer fluid, defined between a surface element with high thermal conductivity, in direct contact with cells, and a surface element with low thermal conductivity,
wherein the bottom region comprises several heat exchange zones each comprising a surface element with high thermal conductivity, each of which is an element added in the housing and has material that is rigid and a good heat conductor, including metal, liquid-tightly secured to a surface element with low thermal conductivity,
in that each surface element with high thermal conductivity in the form of a plate is secured with the wall of the housing, on one side, peripherally, continually and by mechanical attachment or welding, and, on its other side, in at least one bonding zone situated inside the surface of said plate,
in that the housing is made of a rigid material with low thermal conductivity and has a bottom tray, with a bottom wall and lateral walls, and of a top cover, and
in that the cover also incorporates, in its structure, one or more zones for exchanging heat between at least some of the cells and the heat-transfer fluid, the or each heat exchange zone of the cover comprising a volume for circulation of heat-transfer fluid and being constituted by of the cooperation of a formation or depression of the wall of the cover, constituting a surface element with low thermal conductivity, with a surface element with high thermal conductivity, in the form of a plate and in contact with cells.

21. The battery unit as claimed in claim 20, wherein the bottom tray has formations or depressions in its bottom wall, and optionally in at least some of its lateral walls, these formations or depressions each constituting a surface element with low thermal conductivity and forming, each in cooperation with a surface element with high thermal conductivity, in the form of a plate and in contact with cells, of heat exchange zones each with a volume for circulation of heat-transfer fluid.

22. The battery unit as claimed in claim 20, wherein a flexible and thermally conductive sheet or leaf is inserted between the surface element or elements with high thermal conductivity of the heat exchange zone or zones incorporated in the cover, the bottom of the tray and/or in the lateral walls of the tray, on one side, and the faces concerned of the cells of the facing modules, on its other side.

* * * * *